(12) United States Patent
Chi et al.

(10) Patent No.: US 11,474,398 B2
(45) Date of Patent: Oct. 18, 2022

(54) ELECTRONIC DEVICES HAVING MULTIPLE ALIGNMENT LAYERS

(71) Applicant: InnoLux Corporation, Miao-Li County (TW)

(72) Inventors: Jen-Hai Chi, Miao-Li County (TW); Chean Kee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 70 days.

(21) Appl. No.: 15/931,594

(22) Filed: May 14, 2020

(65) Prior Publication Data

US 2020/0363666 A1 Nov. 19, 2020

Related U.S. Application Data

(60) Provisional application No. 62/849,168, filed on May 17, 2019.

(30) Foreign Application Priority Data

Nov. 7, 2019 (CN) .......................... 201911080193.5

(51) Int. Cl.
 *G02F 1/1337* (2006.01)
 *G02F 1/1339* (2006.01)
 (Continued)

(52) U.S. Cl.
 CPC .......... *G02F 1/1337* (2013.01); *G02F 1/1339* (2013.01); *G02F 1/13439* (2013.01);
 (Continued)

(58) Field of Classification Search
 CPC ............ G02F 1/1337; G02F 1/133302; G02F 1/133368; G02F 1/1339; G02F 2202/043; G02F 2202/28
 See application file for complete search history.

(56) References Cited

U.S. PATENT DOCUMENTS 6,697,131 B2 * 2/2004 Takami ............... G02F 1/13473
349/113
7,532,383 B2 5/2009 Jang et al.
(Continued)

FOREIGN PATENT DOCUMENTS

| CN | 101303503 | 11/2008 |
|---|---|---|
| CN | 202275248 U | 6/2012 |
| CN | 106873197 | 6/2017 |

*Primary Examiner* — Paisley L Wilson
(74) *Attorney, Agent, or Firm* — Winston Hsu

(57) ABSTRACT

An electronic device includes a first substrate, a second substrate disposed opposite to the first substrate, and a third substrate disposed between the first substrate and the second substrate, wherein the third substrate has a first surface closer to the first substrate and a second surface closer to the second substrate. A first alignment layer having a first alignment direction is disposed on a surface of the first substrate. A second alignment layer is disposed on a surface of the second substrate. A third alignment layer having a third alignment direction is disposed on a first surface of the third substrate, and a fourth alignment layer is disposed on the second surface of the third substrate. The third alignment direction is perpendicular to the first alignment direction.

8 Claims, 9 Drawing Sheets

(51) Int. Cl.
 *G02F 1/1343* (2006.01)
 *G02F 1/1347* (2006.01)
 *G02F 1/1333* (2006.01)

(52) U.S. Cl.
 CPC .... *G02F 1/13475* (2013.01); *G02F 1/133302* (2021.01); *G02F 1/133368* (2021.01); *G02F 2202/04* (2013.01); *G02F 2202/043* (2013.01); *G02F 2202/28* (2013.01)

(56) References Cited

U.S. PATENT DOCUMENTS 7,776,478 B2    8/2010  Klaassen
10,108,058 B2 * 10/2018  Junge .................... C09K 19/60

* cited by examiner

ELECTRONIC DEVICES HAVING MULTIPLE ALIGNMENT LAYERS

CROSS REFERENCE TO RELATED APPLICATION

This application claims the benefit of U.S. provisional application No. 62/849,168, filed May 17, 2019. The above-mentioned applications are included in their entirety herein by reference.

BACKGROUND OF THE DISCLOSURE

1. Field of the Disclosure

The present disclosure relates to an electronic device, and more particularly, to an electrically controlled light-adjusting device.

2. Description of the Prior Art

A light-adjusting device (also known as an electrically controlled light-adjusting device, an electrically controlled device or an intelligent light-adjusting device) is a kind of electrochromic device which may adjust the color or intensity of light by applying a control voltage to a functional material layer of the device.

Currently, extensive research has been conducted on the development of electrically controlled light-adjusting devices. However, there are still many technical issues to be overcome. For example, how to further reduce the light transmittance of the light-adjusting device in a low transmission state to increase shielding efficiency and enlarge adjustable range between a high transmission state and a low transmission state are still under aggressive research in the technical field.

SUMMARY OF THE DISCLOSURE

One objective of the present disclosure is to provide an electronic device having enlarged adjustable range between the high transmission state and the low transmission state thereof.

An electronic device is provided in an embodiment of the present disclosure. The electronic device includes a first substrate, a first alignment layer having a first alignment direction disposed on a surface of the first substrate, a second substrate disposed opposite to the first substrate, a second alignment layer disposed on a surface of the second substrate, a third substrate disposed between the first substrate and the second substrate and having a first surface closer to the first substrate and a second surface closer to the second substrate, a third alignment layer having a third alignment direction disposed on the first surface of the third substrate, and a fourth alignment layer disposed on the second surface of the third substrate. The third alignment direction is perpendicular to the first alignment direction.

The present disclosure utilizes alignment layers to cause the liquid crystal molecules of the dye-doped liquid crystal layer to twist at a specific angle, by which the dye molecules may be forced to twist at the specific angle concurrently, allowing the dye molecules to absorb specific polarized lights. Problems of light leakage at a large viewing angle may be reduced such that light shielding efficiency of the electronic device in the low transmission state may be increased. The transmittance of the electronic device provided by the present disclosure may have increased adjustable range between the high transmission state and the low transmission state.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 7A, FIG. 7B, FIG. 8A and FIG. 8B are schematic diagrams illustrating the orientations of the liquid crystal molecules and the dye molecules of the dye-doped liquid crystal layer according to some embodiments, in which:

FIG. 7A is a schematic diagram illustrating the orientations of the positive liquid crystal molecules and the positive dye molecules of the dye-doped liquid crystal layer when no electrical field is applied;

FIG. 7B is a schematic diagram illustrating the orientations of the positive liquid crystal molecules and the positive dye molecules of the dye-doped liquid crystal layer when an electrical field is applied.

FIG. 8A is a schematic diagram illustrating the orientations of the negative liquid crystal molecules and the negative dye molecules of the dye-doped liquid crystal layer when no electrical field is applied.

FIG. 8B is a schematic diagram illustrating the orientations of the negative liquid crystal molecules and the negative dye molecules of the dye-doped liquid crystal layer when an electrical field is applied.

DETAILED DESCRIPTION

Figure 1:
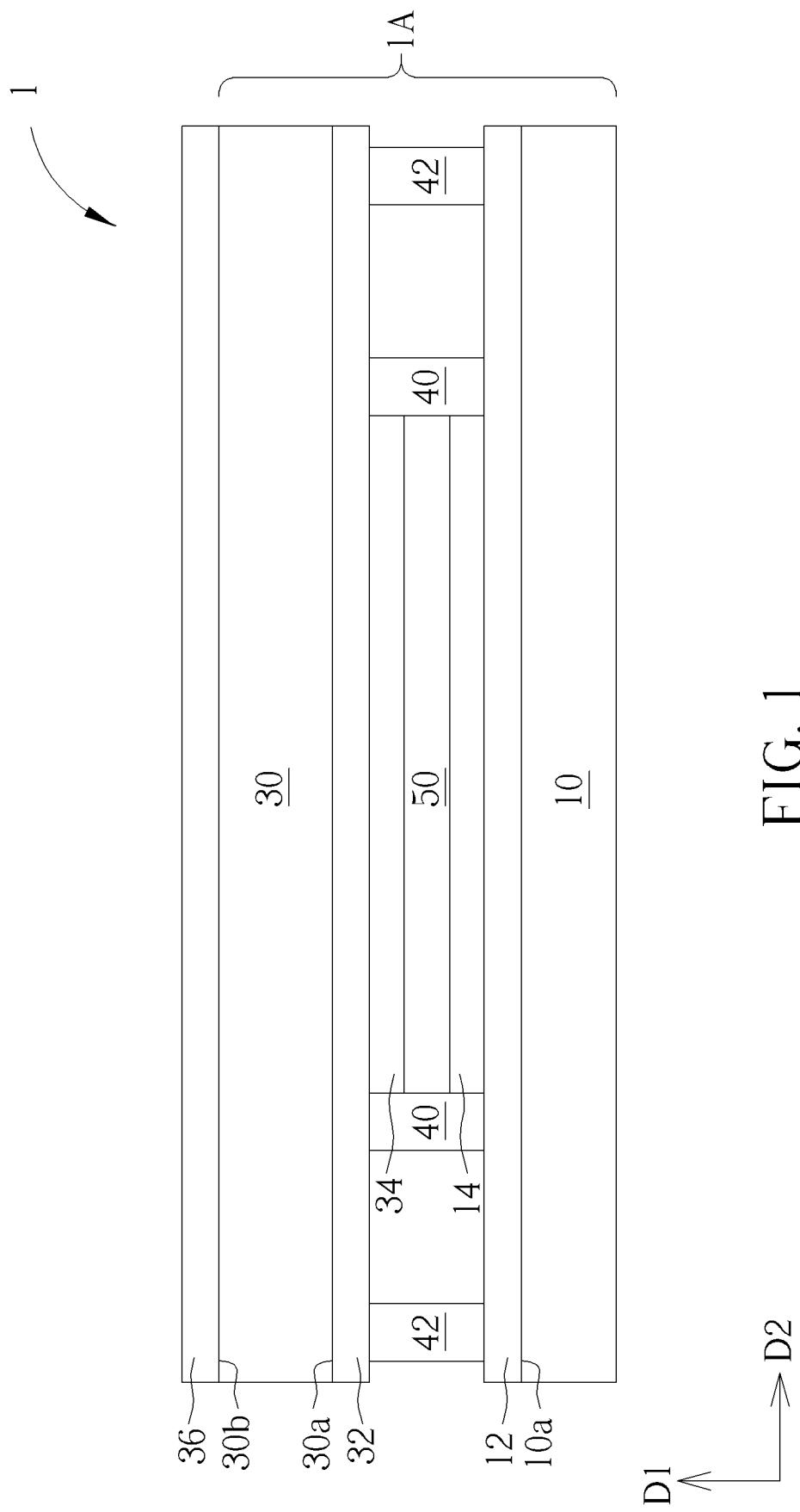
FIG. 1, FIG. 2, FIG. 3 and FIG. 4 are schematic diagrams illustrating the cross-sectional structures of an electronic device at different manufacturing steps according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". It will be understood that when a component is referred to as being "connected to" another component (or its variant), it can be directly connected to the "another component", or connected to the another component through one or more intervening components.

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

Although the terms such as first, second, etc. may be used in the description and following claims to describe various components in claims, these terms doesn't mean or represent the claimed components have order and doesn't represent the order of one claimed component and another one claimed component, or the sequence in manufacturing method. These terms are used to discriminate a claimed component with a denomination from another one claimed component with the same denomination.

It should be noted that the technical features in different embodiments described in the following description can be replaced, recombined, or mixed with one another to constitute another embodiment without departing from the spirit of the present disclosure.

The term "transmittance (T)" described in this disclosure indicates the ability of light to pass through the medium and is generally expressed as the percentage of the luminous flux passing through the medium to the incident luminous flux, such as 0% to 100%. A transmittance of 0% indicates the light being completely absorbed by the medium. A transmittance of 100% indicates the light completely passes through the medium. The terms "high transmission state" and "low transmission state" of a medium described in this disclosure are relative terms that "high transmission state" has transmittance higher than the transmittance of the "low transmission state". According to some embodiments, the "high transmission state" is the state of the electronic device at the highest transmittance that can be achieved. For example, the transmittance of the electronic device in the high transmission state may be greater than or equal to 30% and less than or equal to 100%, or between any ranges defined by the above values. On the other hand, the "low transmission state" is the state of the electronic device at the lowest transmittance that can be achieved. For example, the transmittance of the electronic device in the low transmission state may be less than or equal to 20% and greater than or equal to 0%, or between the range defined by the above values. The ratio of the transmittance of "high transmittance" to the transmittance of "low transmittance" is the contrast of the electronic device.

The electronic device provided in the embodiments of the present disclosure may be an electrically controlled device, which may be applied in the fields of architecture, automobiles, interior decoration, signboards, window or optical devices, but not limited thereto.

FIG. 1, FIG. 2, FIG. 3 and FIG. 4 are schematic diagrams illustrating the cross-sectional structures of an electronic device at different manufacturing steps according to a first embodiment of the present disclosure. Please refer to FIG. 3. The electronic device 1 includes a first liquid crystal cell 1A and a second first liquid crystal cell 1B. The first liquid crystal cell 1A includes a first substrate 10 and a third substrate 30 opposite to each other. Between the first substrate 10 and the third substrate 30 are a first conductive layer 12 and a first alignment layer 14 disposed on a surface 10a of the first substrate 10 and a third conductive layer 32 and a third alignment layer 34 disposed on a surface (such as a first surface 30a) of the third substrate 30. The surface 30a of the third substrate 30 is closer to the first substrate 10. The first conductive layer 12 is disposed between the first substrate 10 and the first alignment layer 14. The third conductive layer 32 is disposed between the third substrate 30 and the third alignment layer 34. Furthermore, a sealant 40 is disposed between the first substrate 10 and the third substrate 30 and at two sides of the first alignment layer 14 and the third alignment layer 34 for sealing a space that is filled by an optical media layer. In the embodiment, the space sealed by the sealant 40 may be filled with a first dye-doped liquid crystal layer 50, but not limited thereto. The first dye-doped liquid crystal layer 50 is disposed between the first alignment layer 14 and the third alignment layer 34. In some embodiments, optionally, a dummy sealant 42 may be disposed between the first substrate 10 and the third substrate 30 and positioned outside the sealant 40. The second liquid crystal cell 1B includes a second substrate 20 and the third substrate 30 opposite to each other. Between the second substrate 20 and the third substrate 30 are a second conductive layer 22 and a second alignment layer 24 disposed on a surface 20a of the second substrate 20 and a fourth conductive layer 36 and a fourth alignment layer 38 disposed on a surface (such as the second surface 30b) of the third substrate 30 that is opposite to the first surface 30a. The surface 30b of the third substrate 30 is closer to the second substrate 20. The second conductive layer 22 is disposed between the second substrate 20 and the second alignment layer 24. The fourth conductive layer 36 is disposed between the third substrate 30 and the fourth alignment layer 38. Furthermore, a sealant 44 is disposed between the second substrate 20 and the third substrate 30 and at two sides of the second alignment layer 24 and the fourth alignment layer 38 for sealing a space that is filled by an optical media layer. In the embodiment, the space sealed by the sealant 44 may be filled with a second dye-doped liquid crystal layer 52, but not limited thereto. The second dye-doped liquid crystal layer 52 is disposed between the second alignment layer 24 and the fourth alignment layer 38. In some embodiments, optionally, a dummy sealant 46 may be disposed between the second substrate 20 and the third substrate 30 and positioned outside the sealant 44. In some embodiments, a spacer (photospacer, not shown) may be included between the first substrate 10 and the third substrate 30 and/or between the second substrate 20 and the third substrate 30. In some embodiments, an insulating layer, an optical film, an anti-reflection layer, or the like may be provided on the surface 10b of the first substrate 10 and the surface 20b of the second substrate 20, but not limited thereto. In some embodiments, the optical films may include anti-ultraviolet light films, optical filters or other suitable optical films, but not limited thereto.

According to some embodiments, the first liquid crystal cell 1A and the second liquid crystal cell 1B may be manufactured by the following process. First, as shown in FIG. 1, the first substrate 10 is provided. Subsequently, the first conductive layer 12 is formed on the surface 10a of the first substrate 10 by, for example, deposition, plating, or coating. Later, the first alignment layer 14 is formed on the first conductive layer 12. After forming the sealant 40 and the dummy sealant 42, a one drop fill (DOF) process may be performed to drop the liquid crystal molecules with doped dye molecules in the region surrounded by the sealant 40 thereby forming the first dye-doped liquid crystal layer 50. Afterword, the third substrate 30 having the third conductive layer 32 and the third alignment layer 34 disposed thereon is bonded to the first substrate 10. In other embodiments, the first liquid crystal cell 1A may be manufactured by bonding the first substrate 10 and the third substrate 30 to make the space for accommodating the liquid crystal molecules and then injecting the liquid crystal molecules with doped dye molecules into the space by performing a vacuum suction process. The above manufacturing process should be known in the art and the detailed manufacturing steps are not narrated herein for the sake of simplicity. As shown in FIG. 1, before the third substrate 30 is bonded to the first substrate 10, the fourth conductive layer 36 may be formed in advance on the second surface 30b that is opposite to the first surface 30a of the third substrate 30 in order to simplify the process. It should be understood that in other embodiments, the fourth conductive layer 36 may be formed on the second surface 30b of the third substrate 30 after bonding the first substrate 10 and the third substrate 30.

The first substrate 10 and the third substrate 30 may be hard substrates or flexible substrates. The materials of the first substrate 10 and the third substrate 30 may include glass, quartz, sapphire, plastic, other suitable materials, or a combination thereof. The plastic materials of the first substrate 10 and the third substrate 30 may include, for example, polyimide (PI), polycarbonate (PC), polyethylene terephthalate (PET), other suitable plastic materials, or a combination thereof, but not limited thereto. According to an embodiment of the present disclosure, the first substrate 10 and the third substrate 30 may be soda-lime glass substrates, but are not limited thereto.

The first conductive layer 12 and the third conductive layer 32 may include transparent conductive materials, such as indium tin oxide (ITO), antimony doped tin oxide (ATO), and fluorine doped tin oxide (FTO), but not limited thereto.

The first alignment layer 14 and the third alignment layer 34 have the ability to align liquid crystal molecules, so that the liquid crystal molecules are aligned in a specific alignment direction. The first alignment layer 14 and the third alignment layer 34 may be manufactured by, for example, coating an alignment material (such as polyimide, PI) on the substrate and then performing an alignment treatment to the alignment material, such as rubbing alignment treatment, photo alignment treatment, ion beam alignment treatment, plasma beam alignment, but not limited thereto. According to an embodiment of the present disclosure, the alignment directions of the first alignment layer 14 and the third alignment layer 34 are substantially perpendicular to each other.

The first dye-doped liquid crystal layer 50 includes liquid crystal molecules and at least one type of dye molecules. Due to the refractive index anisotropy of liquid crystal molecules, light with different polarization directions will have different refractive indices when passing through liquid crystal molecules. Accordingly, liquid crystal materials may modulate the polarization direction of light. Each of the liquid crystal molecules may a shape equivalent to long strip (long rod). The direction of a long axis (molecular axis) of each of the liquid crystal molecules is consistent with the direction of an optic axis of the liquid crystal molecule. In addition, according to the dielectric anisotropy of the liquid crystal molecules, the liquid crystal molecules may be positive-type (positive dielectric anisotropy) or negative-type (negative dielectric anisotropy). More specifically, when the long axis of the liquid crystal molecule is parallel to the direction of the applied electric field, the liquid crystal molecules is positive-type. On the other hands, when the short axis of the liquid crystal molecule is parallel to the direction of the applied electric field, the liquid crystal molecule is negative-type. According to an embodiment of the present disclosure, the first dye-doped liquid crystal layer 50 may include nematic liquid crystal molecules, smectic liquid crystal molecules, or cholesterol liquid crystal molecules, but are not limited thereto. The first dye-doped liquid crystal layer 50 may further include other components, such as chirality molecules or other property-adjusting components.

The dye molecules in the first dye-doped liquid crystal layer 50 may be any suitable dichroic dyes. For example, the dye molecules suitable for the first dye-doped liquid crystal layer 50 may have a geometric anisotropy, long-rod shaped with a long axis (molecular axis) and a short axis, and different absorption rates for visible light along the long axis and the short axis. In particular, selective absorption of dichroic dyes is more obvious for polarized lights. Dye molecules absorbing light component parallel to the long axis (light absorption axis) are positive-type dichroic dye. In contrast, dye molecules absorbing light component parallel to the short axis are negative-type dichroic dye.

Figure 7A:
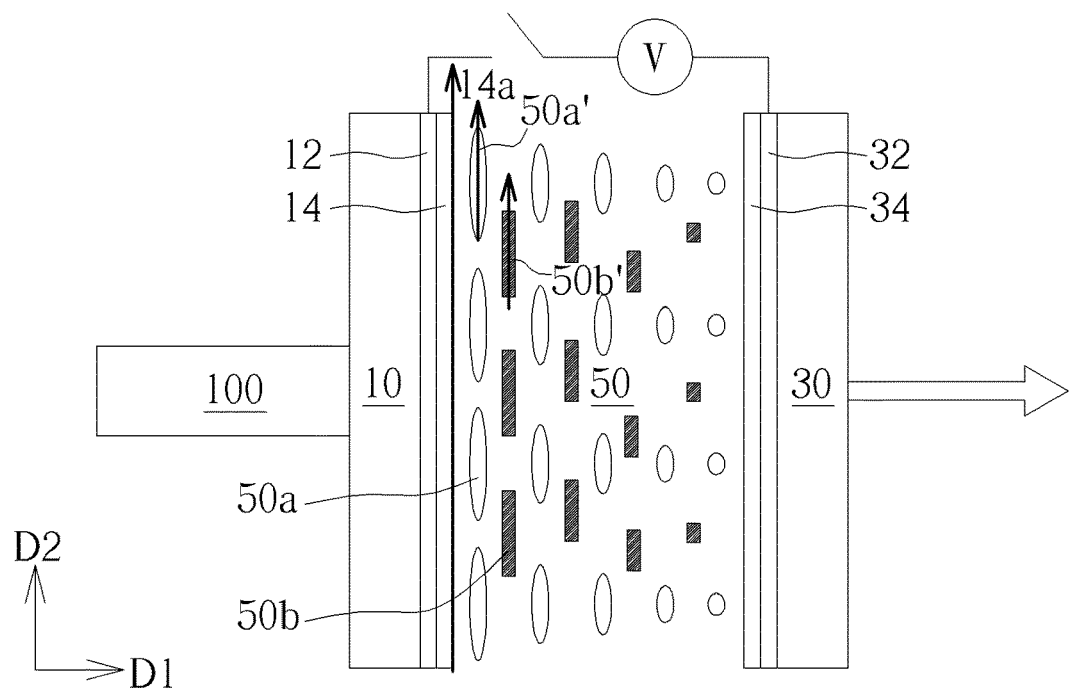

It is noticeable that the orientations of the dye molecules and the liquid crystal molecules in the dye-doped liquid crystal layer 50 are significantly correlated and the long axes of the dye molecules are usually parallel to the long axes of the liquid crystal molecules. This is because that the dye molecules may be forced to twist by the liquid crystal molecules. For example, as shown in FIG. 7A, the molecular axis 50' of the liquid crystal molecules are naturally parallel to the first alignment direction 14a of the first alignment layer 14, and the molecular axis 50b' of the dye molecules are parallel to the molecular axis 50' of the liquid crystal molecules and the first alignment direction 14a of the first alignment layer 14. For example, in an embodiment, the first alignment direction 14a may be the direction D2, and consequently the molecular axis 50' of the liquid crystal molecules and the molecular axis 50b' of the dye molecules are parallel to the direction D2. Therefore, by controlling the orientations of the liquid crystal molecules by applying an electric field, the control over the orientations and the light-absorbing states of the dye molecules may be achieved.

The type of dye molecules may be selected based on filling ability and compatibility with the liquid crystal molecules. Other factors such as light resistance (light stability) and heat resistance (thermal stability) are also important. According to an embodiment of the present disclosure, the dye molecules of the dye-doped liquid crystal layer 50 may absorb visible light. For example, the dye molecules may absorb light of wavelength between 380 nm and 780 nm. According to an embodiment of the present disclosure, the dye molecules, for example, may be azo-based dichroic dyes or anthraquinone-based dichroic dyes.

Figure 2:
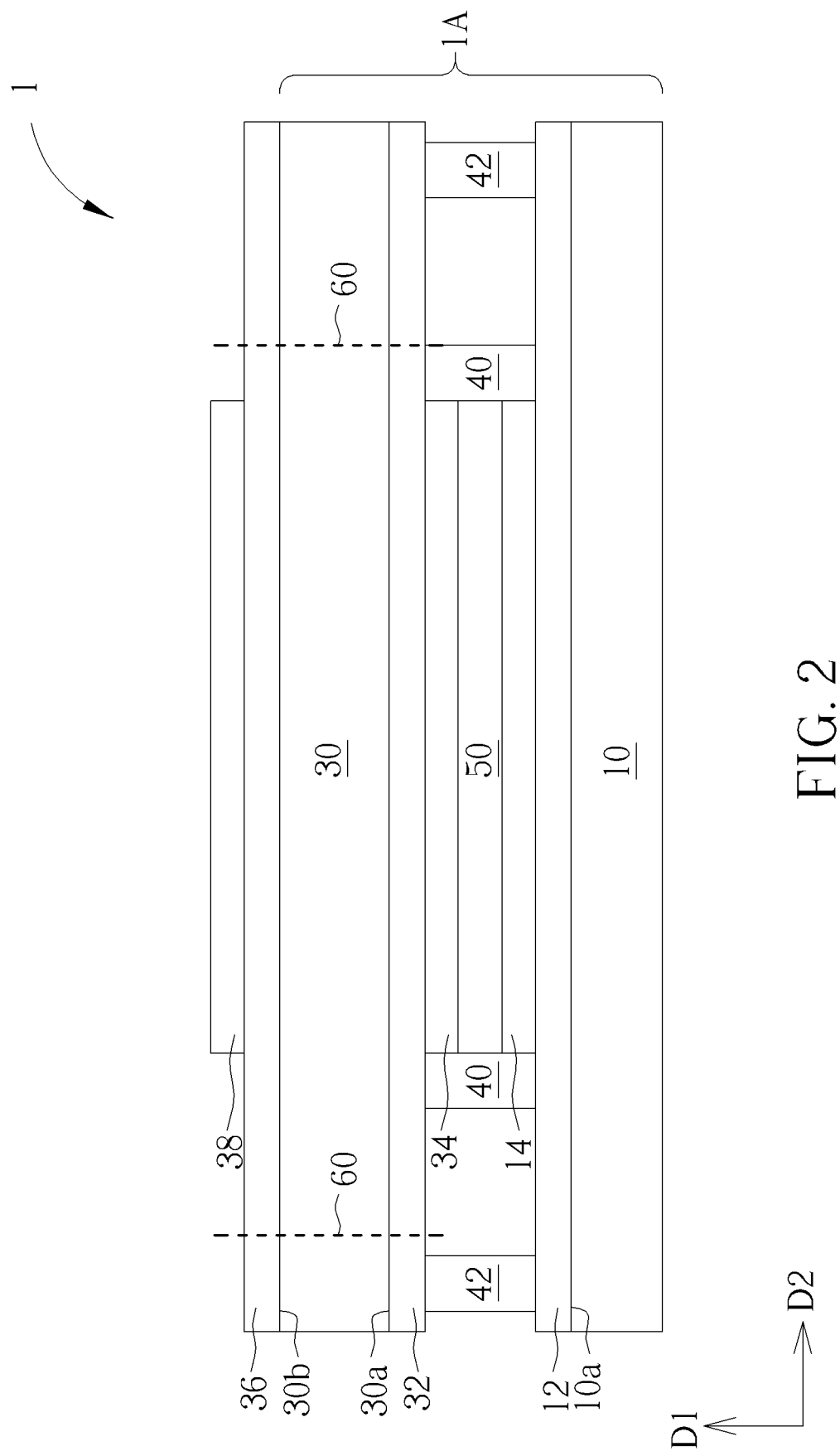

Please refer to FIG. 2. The second liquid crystal cell 1B may be manufactured on the first liquid crystal cell 1A. For example, the fourth alignment layer 38 is then formed on the fourth conductive layer 36 on the second surface 30b of the third substrate 30. Afterward, a pre-cutting step is performed on the third substrate 30 to form a pre-cutting mark 60 on the third substrate 30 to define a portion of the third substrate 30 (and the conductive layers thereon) to be removed in a later process. The pre-cutting mark 60 may be approximately located between the sealant 40 and the dummy sealant 42. The dummy sealant 42 may provide temporary support for the pre-cut portion of the third substrate 30 and prevent it from peeling off in subsequent processes. The materials and manufacturing methods of the fourth conductive layer 36 and the fourth alignment layer 38 may be the same with respect to the first conductive layer 12, the third conductive layer 32, the first alignment layer 14 and the third alignment layer 34 as described above, and are not repeated here for the sake of simplicity.

Figure 3:
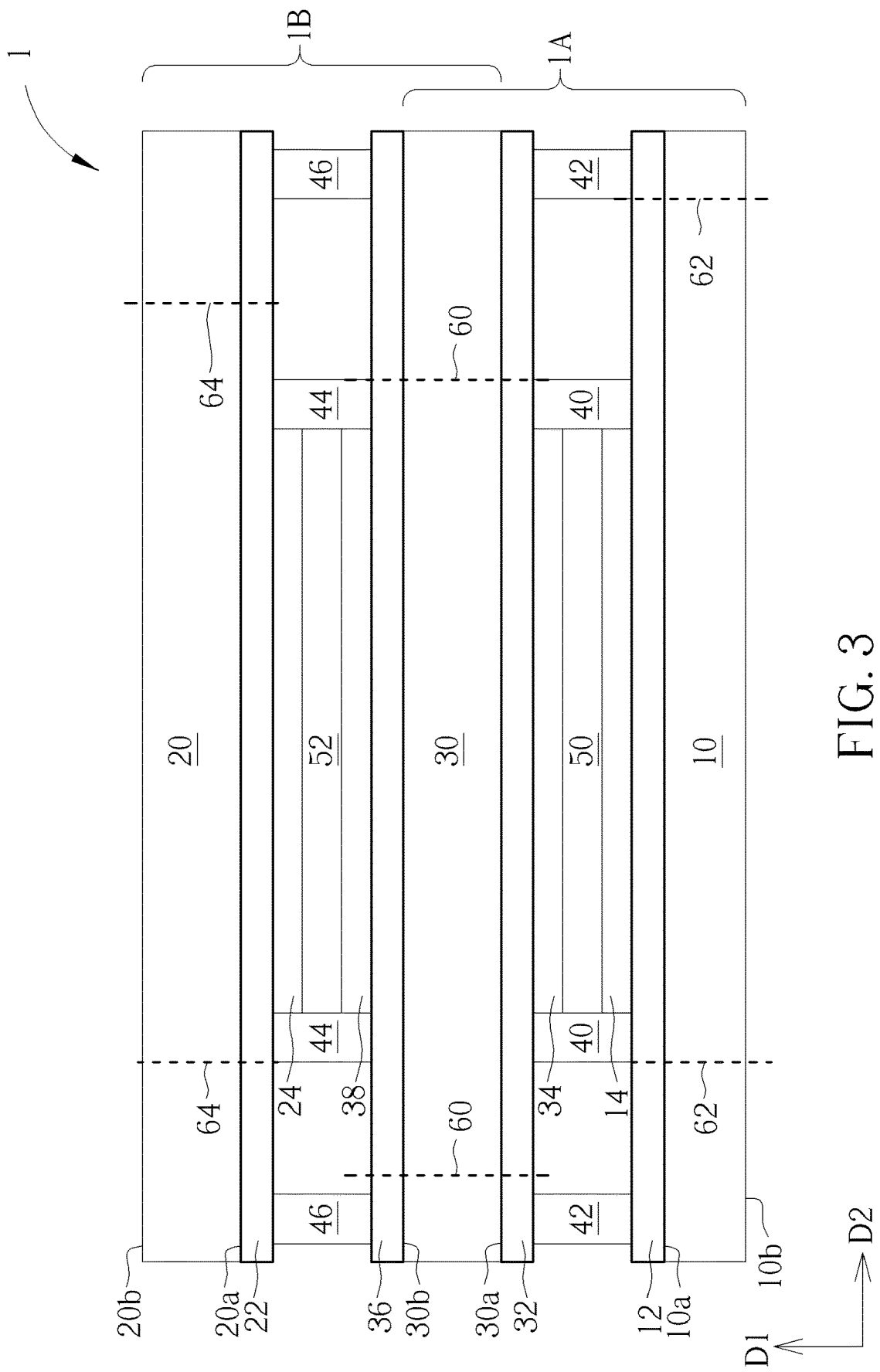

Please refer to FIG. 3. Subsequently, the sealant 44 and the dummy sealant 46 disposed outside the sealant 44 are formed on the second surface 30b of the third substrate 30. The second dye-doped liquid crystal layer 52 is then formed in the area surrounded by the frame glue 44. Afterward, the second substrate 20 having the second conductive layer 22 and a second alignment layer 24 formed on the surface therefore is provided and bonded to the third substrate 30 by the sealant 44 and the dummy sealant 46. As shown in FIG. 3, the second conductive layer 22 and the second alignment layer 24 are disposed on the surface 20a of the second substrate 20 and face the third substrate 30. According to an embodiment, the second dye-doped liquid crystal layer 52 may be formed by one drop fill (DOF) process before bonding the second substrate 20 to the third substrate 30, or by vacuum suction process after bonding the second substrate 20 to the third substrate 30, but not limited thereto. Subsequently, a cutting step is performed to cut the first substrate 10 along the cutting mark 62 and cut the second substrate 20 along the cutting mark 64. Then, the unnecessary portions of the first substrate 10, the second substrate 20 and the third substrate 30 and films thereon are removed along the cutting marks 62 and 64 and the pre-cutting mark 60 to obtain the structure shown in FIG. 4. It is noteworthy that the pre-cutting mark 60 is formed by partially cut the third substrate 30 without cutting through the third substrate 30. The unnecessary portions of the third substrate 30 are removed at the same time when cutting the first substrate 10 and the second substrate 20. The second dye-doped liquid crystal layer 52 includes liquid crystal molecules and at least one type of dye molecules. According to an embodiment of the present disclosure, the second dye-doped liquid crystal layer 52 may include the same composition as the first dye-doped liquid crystal layer 50. For example, the second dye-doped liquid crystal layer 52 and the first dye-doped liquid crystal layer 50 may have same liquid crystal molecules and dye molecules, but the proportion of the compositions may be adjusted according to demand.

Figure 4:
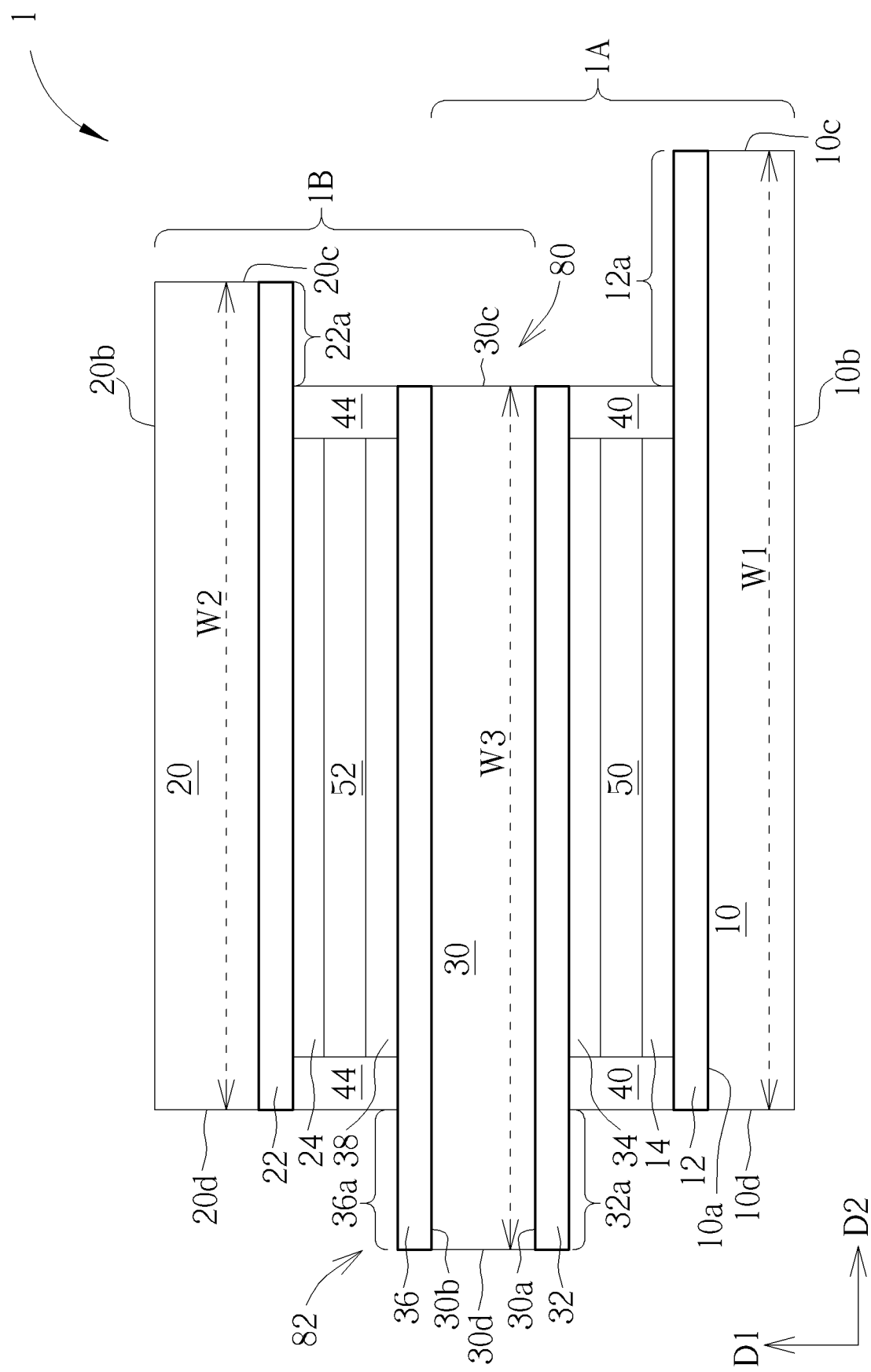

According to some embodiments of the present disclosure, the pre-cutting and cutting steps may make the sidewalls of the first substrate 10, the third substrate 30, and the second substrate 20 misaligned along the normal direction of the surface 10a of the first substrate 10 (such as the direction D1). That is, the sidewalls of the first substrate 10, the third substrate 30, and the second substrate 20 are not located on a same vertical plane. In this way, the required electrical connections between the first conductive layer 12, the third conductive layer 32, the fourth conductive layer 36, and the second conductive layer 22 may be obtained. For example, as shown in FIG. 4, a part of the sidewall of the third substrate 30 (the sidewall 30c on the right side in FIG. 4) is recessed from the sidewall 10c of the first substrate 10 and the sidewall 20c of the second substrate 20 to form a recessed portion 80 of the electronic device 1. In other words, along the direction D1 perpendicular to the surface 10a of the first substrate 10, the sidewall 10c of the first substrate 10 and the sidewall 20c of the second substrate 20 protrude from the sidewall 30c of the third substrate 30. The third substrate 30 does not overlap some portions of the first conductive layer 12 and the second conductive layer 22. The portions of the first conductive layer 12 and the second conductive layer 22 not overlapped by the third substrate 30 are exposed in the recessed portion 80 and may be used as contact points for providing electrical connections, such as the electrode 12a (the range designated as 12a in FIG. 4) for electrically contacting the first conductive layer 12 and the electrode 22a (the range designated as 22a in FIG. 4) for electrically contacting the second conductive layer 22. Similarly, the sidewall 30d (the sidewall 30d on the left side in FIG. 4) of the third substrate 30 protrudes from the sidewall 10d of the first substrate 10 and the sidewall 20d of the second substrate 20 to form a protruding portion 82 of the electronic device 1. Therefore, some portions of the third conductive layer 32 on the first surface 30a of the third substrate 30 and the fourth conductive layer 36 on the second surface 30b are exposed and may be used as contact points for providing electrical connections, such as the electrode 32a (the range designated as 32a in FIG. 4) for electrically contacting the third conductive layer 32 and the electrode 36a (the range designated as 36a in FIG. 4) for electrically contacting the fourth conductive layer 36. In some embodiments, the width W1 of the first substrate 10 along a direction D2 (such as the direction parallel to the surface 10a of the first substrate 10) may be different from the width W2 of the second substrate 20 along the direction D2. In some embodiments, the width W1 of the first substrate 10 may be different from the width W3 of the third substrate 30 in the direction D2. For example, the width W1 may be greater than the width W2 and the width W3. The width relationship between the first substrate 10, the second substrate 20 and the third substrate 30 is not limited to the above example. In some embodiments, the sidewall 10d of the first substrate 10 and the sidewall 20d of the second substrate 20 (on the left side in FIG. 4) may be aligned along the direction D1. The sidewall 10c of the first substrate 10 and the sidewall 20c of the second substrate 20 (on the right side in FIG. 4) may be misaligned along the direction D1.

One advantage of the present disclosure is that the electronic device 1 has the first liquid crystal cell 1A and the second liquid crystal cell 1B being formed by using three substrates (the first substrate 10, the second substrate 20 and the third substrate 30 wherein the third substrate 30 is shared by the first liquid crystal cell 1A and the second liquid crystal cell 1B). In this way, the manufacturing time and cost may be reduced.

Figure 5:
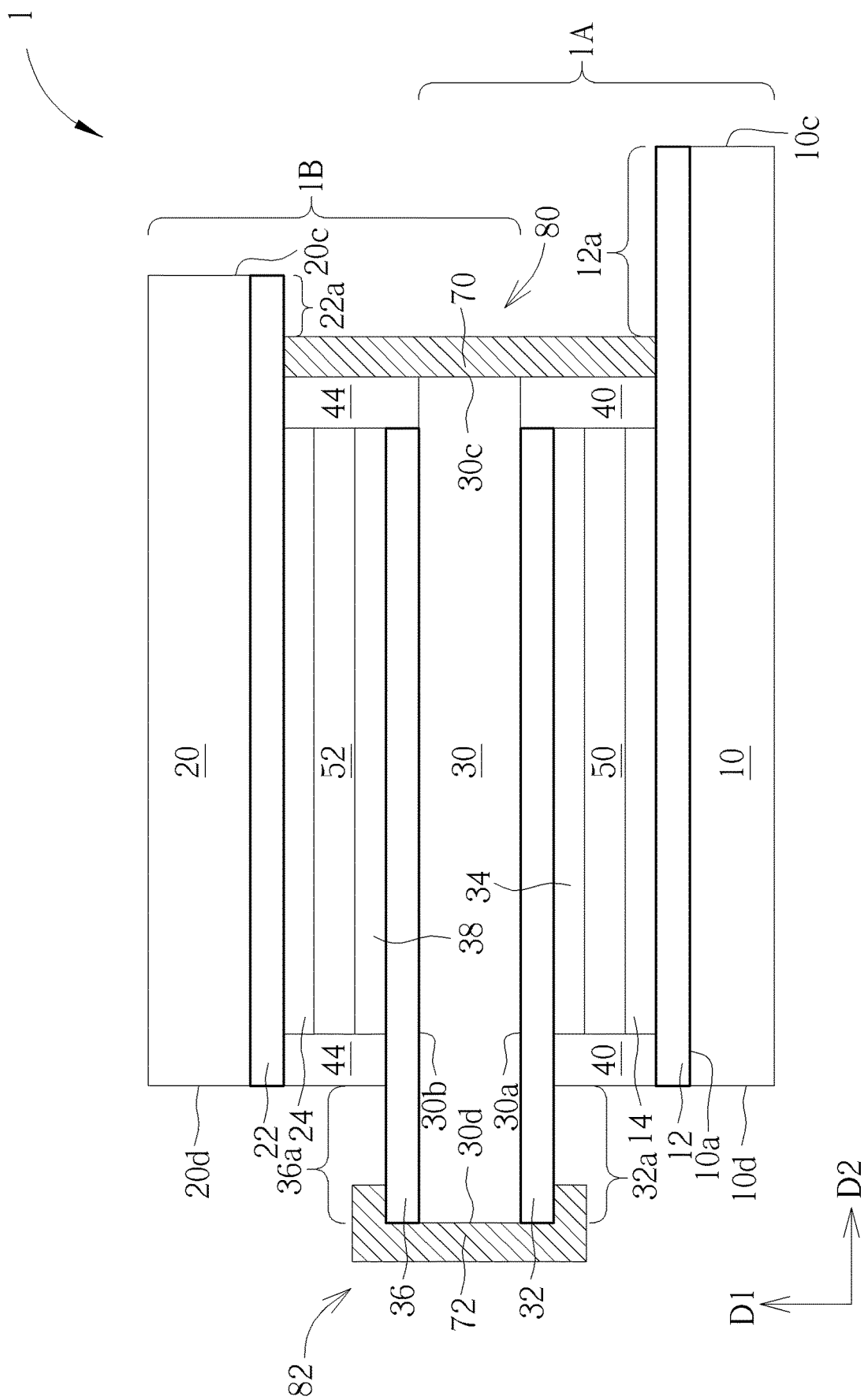
FIG. 5 is a schematic diagram illustrating the cross-sectional structure of an electronic device according to a second embodiment of the present disclosure.

Please refer to FIG. 5. FIG. 5 is a schematic structural cross-sectional view of an electronic device according to a second embodiment of the disclosure. The difference between the embodiments shown in FIG. 4 and FIG. 5 is that, the electronic device in FIG. 5 further has a first conductive adhesive 70 (such as conductive silver paste) provided in the recess 80. The first conductive adhesive 70 may cover a part of the sidewall 30c of the third substrate 30 and is in direct contact with the electrode 12a of the first conductive layer 12 and the electrode 22a of the second conductive layer 22 to electrically connect the first conductive layer 12 and the second conductive layer 22. Similarly, a second conductive paste 72 (such as conductive silver paste) may be provided on the protruding portion 82 to cover a part of the sidewall 30d of the third substrate 30, at least a part of the electrodes 32a of the third conductive layer 32 and at least a part of the electrodes 36a of the fourth conductive layer 36 to electrically connect the third conductive layer 32 and the fourth conductive layer 36.

Figure 6:
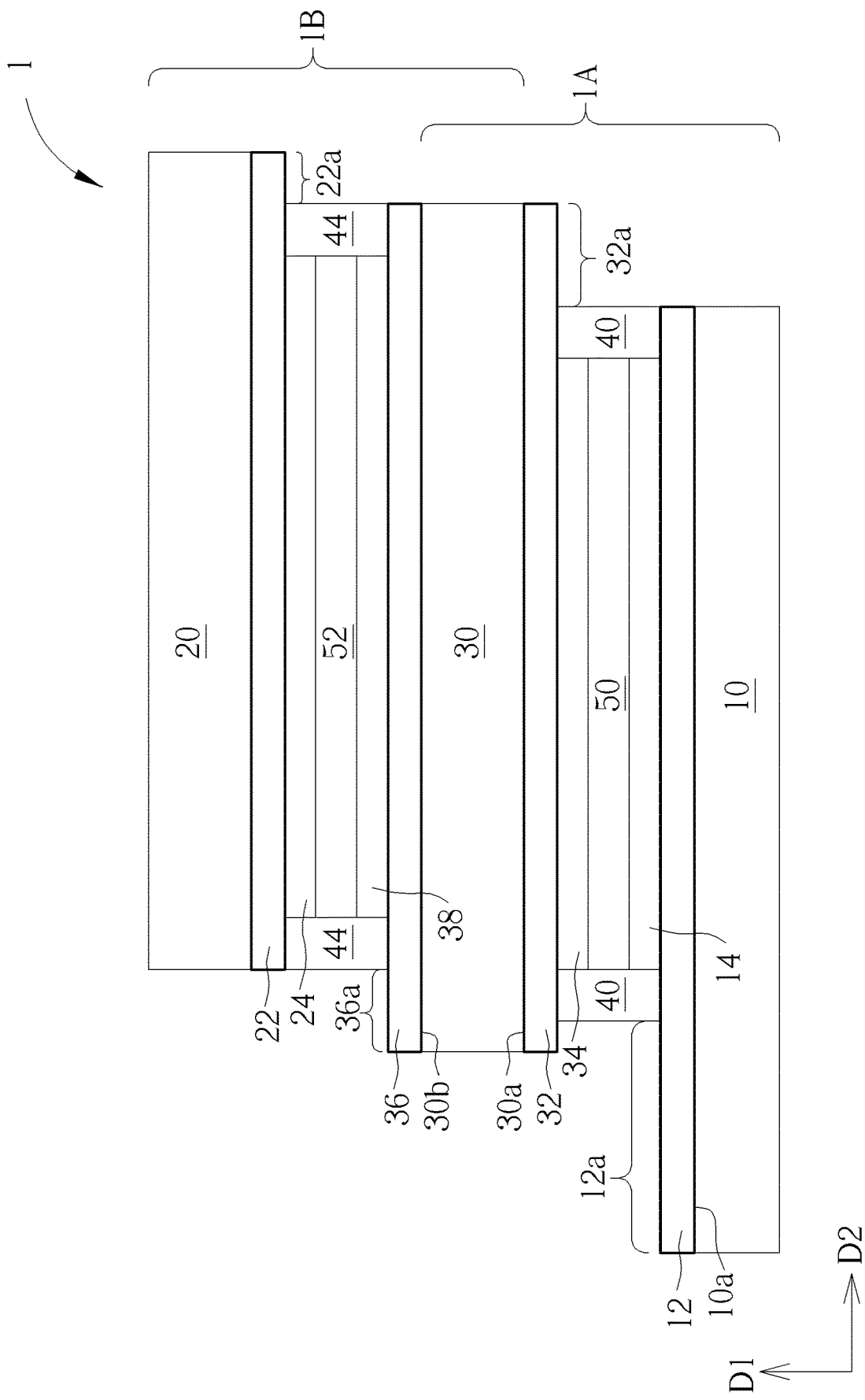
FIG. 6 is a schematic diagram illustrating the cross-sectional structure of an electronic device according to a third embodiment of the present disclosure.

Please refer to FIG. 6. FIG. 6 is a schematic cross-sectional view of the electronic device according to a third embodiment of the present disclosure. The difference between the embodiments shown in FIG. 4 and FIG. 5 and FIG. 6 is that, sidewalls of the first substrate 10, the third substrate 30, and the second substrate 20 of the electronic device 1 shown in FIG. 6 are displaced layer by layer along the direction D2 (such as the horizontal direction) parallel to the surface 10a of the first substrate 10, thereby forming a stepped structure. In this way, the electrode 22a of the second conductive layer 22 and the electrode 32a of the third conductive layer 32 may be exposed on one side of the electronic device 1 (right side of FIG. 6) and the electrode 36a of the fourth conductive layer 36 and the electrode 12a of the first conductive layer 12 may be exposed on the other side of the electronic device 1 (left side of FIG. 6) for further electrical connection. It should be understood that the structures shown in FIG. 4 and FIG. 6 are merely examples, and are not intended to be a limitation to the ways of pre-cutting and cutting steps of the present disclosure. The relative positions of the first substrate 10, the second substrate 20 and the third substrate 30 may be adjusted according to the needs of the application.

The parameters of the first liquid crystal cell 1A, the second liquid crystal cell 1B, or a combination of the first liquid crystal cell 1A and the second liquid crystal cell 1B may be measured using any suitable measuring devices. The parameters may include cell gaps, twist angles, pre-tilt angles, rubbing directions, retardations of lights passing through the first liquid crystal cell 1A and/or the second liquid crystal cell 1B, polarizer efficiency, transmittances, absorption, depolarization, dichorism, but not limited thereto. According to an embodiment of the present disclosure, the first alignment direction 14a (shown in FIG. 9) of the first alignment layer 14 and the third alignment direction 34a (shown in FIG. 9) of the third alignment layer 34 are substantially perpendicular to each other. For example, the first alignment direction 14a of the first alignment layer 14 and the third alignment direction 34a of the third alignment layer 34 may have an included angle of 90±10 degrees, or between 80 and 100 degrees. According to an embodiment of the present disclosure, the thickness of the first liquid crystal cell 1A and the thickness of the second liquid crystal cell 1B may be respectively between approximately 0.003 millimeters (mm) and 0.03 millimeters, but not limited thereto. The thicknesses of the electronic device comprising the first liquid crystal cell 1A and the second liquid crystal cell 1B may be between approximately 1 mm and 20 mm, but not limited thereto. By adjusting the thickness of the liquid crystal cells, the optical modulation effect may be increased.

Figure 7B:
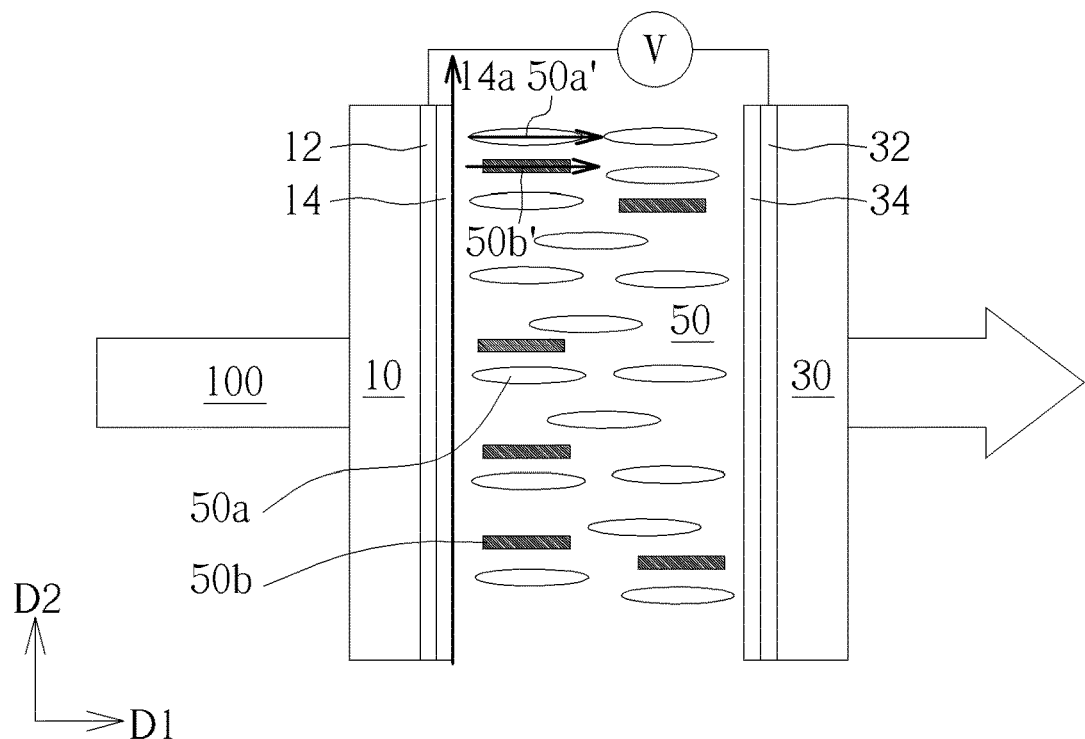
Figure 8A:
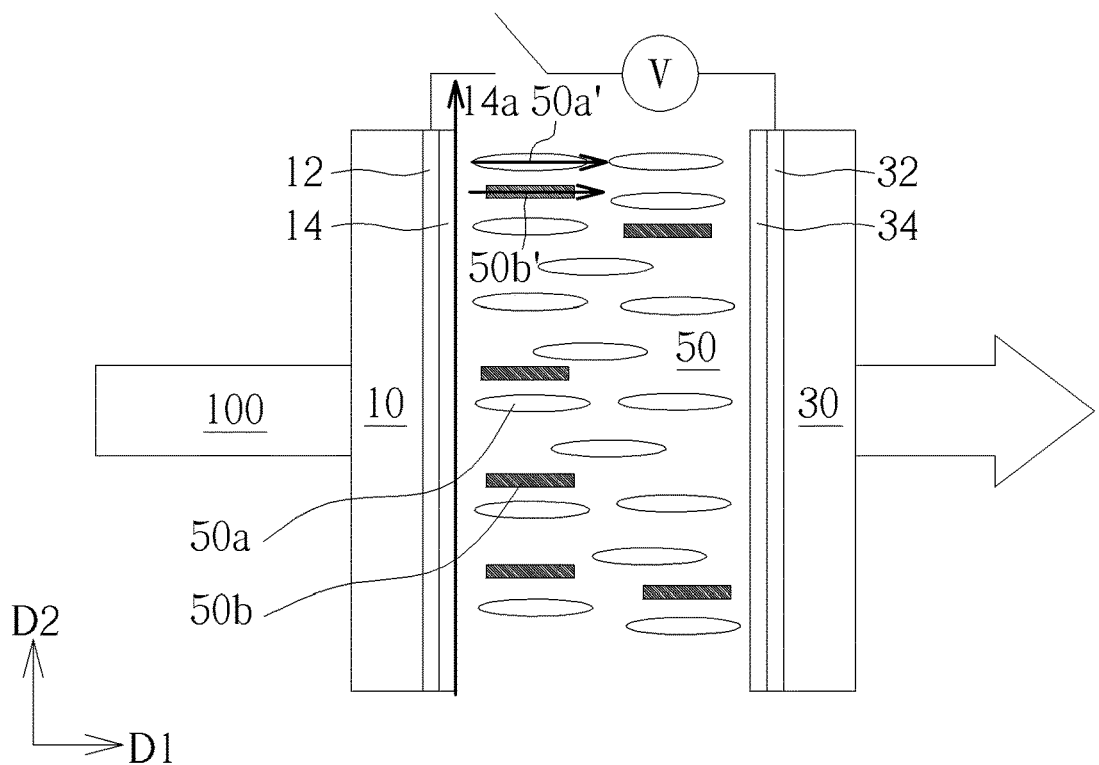
Figure 8B:
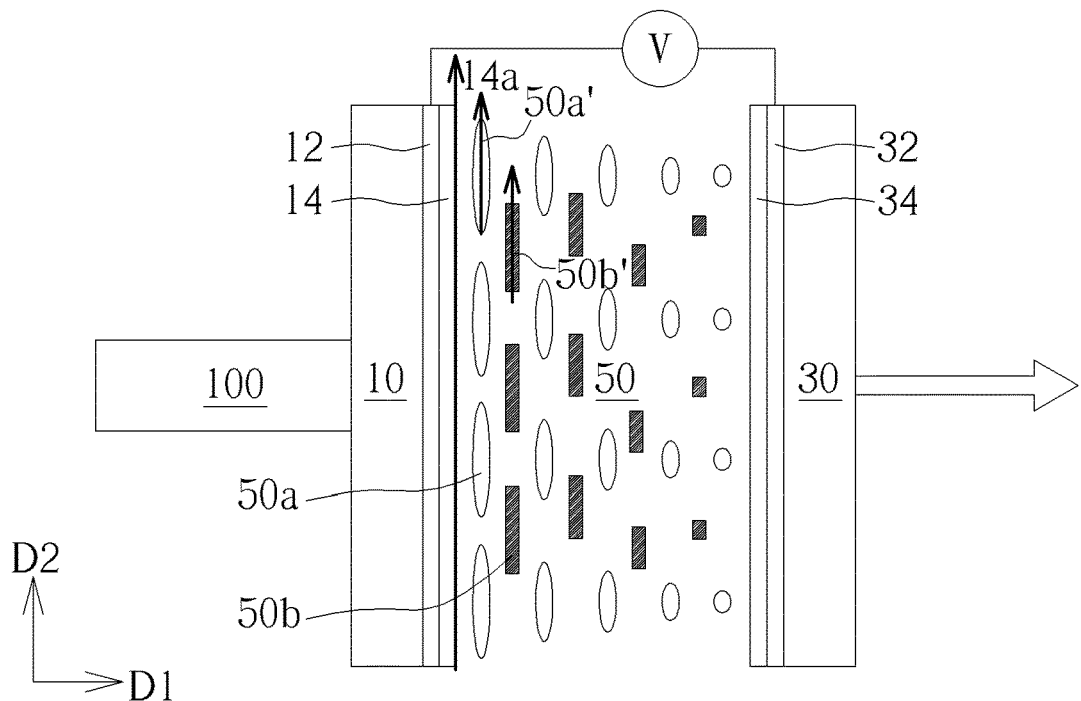

According to the disclosure, the types of liquid crystal molecules and dye molecules may be selected based on application needs. The liquid crystal molecules and dye molecules have good filling ability and compatibility, and also have expected light resistance (light stability) and heat resistance (thermal stability). FIG. 7A, FIG. 7B, FIG. 8A and FIG. 8B are schematic diagrams illustrating the orientations of the liquid crystal molecules 50a and dye molecules 50b of the first dye-doped liquid crystal layer 50 of the first liquid crystal cell 1A (or the second dye-doped liquid crystal layer 52 of the second liquid crystal cell 1B) with and without an electric field being applied. The liquid crystal molecules 50a and dye molecules 50b shown in FIG. 7A and FIG. 7B are positive types. The liquid crystal molecules 50a and dye molecules 50b shown in FIG. 8A and FIG. 8B are negative types. In order to facilitate understanding of the disclosure, the molecular axis 50a' (optical axis) of the liquid crystal molecules 50a and the molecular axis 50b' (light absorption axis) of the dye molecules 50b are also indicated in FIG. 7A, FIG. 7B, FIG. 8A and FIG. 8B.

Please refer to FIG. 7A. When no electric field is applied, the molecular axis 50a' of the positive liquid crystal molecules 50a is naturally parallel to the first alignment direction 14a of the first alignment layer 14. The liquid crystal molecules 50a may gradually twist layer by layer between the first alignment layer 14 and the third alignment layer 34. For example, the molecular axis 50a' of the layer most adjacent to the first alignment layer 14 is at an angle of 90±10 degrees to the layer most adjacent to the third alignment layer 34. The dye molecules 50b may be forced to twist by the liquid crystal molecules. When the light 100 passes through the dye-doped liquid crystal layer 50 along the direction D1, light component parallel to the molecular axis 50b' of the dye molecules 50b would be absorbed by the dye molecules 50b layer by layer. As a result, the transmittance of light 100 through the first dye-doped liquid crystal layer 50 may be reduced, and the electronic device is in a low transmission state (dark state). Please refer to FIG. 7B. When an electric field having a direction D1 is applied between the first conductive layer 12 and the third conductive layer 32, the positive liquid crystal molecules 50a may respond to the electric field and twist at a specific angle where the molecular axis 50a' is parallel to the direction D1. The dye molecules 50b may twist with the liquid crystal molecules 50a, having the molecular axis 50b' parallel to the direction D1. When the light 100 passes through the dye-doped liquid crystal layer 50 along the direction D1, due to the molecular axis 50b' of the dye molecules 50b is substantially parallel to the electrical field and the molecular axis 50a' of the liquid crystal molecules 50a, most of the light 100 would not be absorbed by the dye molecules 50b. When the molecular axis 50b' of the dye molecules 50b is parallel to the electric field, the short axes of the dye molecules 50b are perpendicular to the electric field. In some cases, only a small part of the light 100 may be absorbed by the short-axis absorption of the dye molecules 50b. As a result, the electronic device is in a high transmission state (bright state). By controlling the strength of the electric field, the inclination of the liquid crystal molecules 50a may be adjusted, thereby controlling the light transmittance of the electronic device between a high light transmission state and a low light transmission.

Please refer to FIG. 8A. When no electric field is applied, the molecular axis 50a' of the negative liquid crystal molecules 50a is naturally perpendicular to the first alignment direction 14a of the first alignment layer 14. Accordingly, the molecular axis 50b' of the dye molecules 50b is also perpendicular to the first alignment direction 14a of the first alignment layer 14. Most of the light 100 passes through the dye-doped liquid crystal layer 50 along the direction D1 would not be absorbed by the dye molecules 50b, and the electronic device is in a high transmission state (bright state). Please refer to FIG. 8B. When an electric field having a direction D1 is applied between the first conductive layer 12 and the third conductive layer 32, the negative liquid crystal molecules 50a may respond to the electric field and twist at a specific angle where the molecular axis 50a' is parallel to the first alignment direction 14a of the first alignment layer 14 and may gradually twist layer by layer between the first alignment layer 14 and the third alignment layer 34. For example, the molecular axis 50a' of the layer most adjacent to the first alignment layer 14 is at an angle of 90±10 degrees to the layer most adjacent to the third alignment layer 34. The dye molecules 50b may be forced to twist by the liquid crystal molecules. When the light 100 passes through the dye-doped liquid crystal layer 50 along the direction D1, light component parallel to the molecular axis 50b' of the dye molecules 50b would be absorbed by the dye molecules 50b layer by layer. As a result, the transmittance of light 100 through the first dye-doped liquid crystal layer 50 may be reduced, and the electronic device is in a low transmission state (dark state).

It should be noted that the types and orientations of the liquid crystal molecules shown in FIG. 7A, FIG. 7B, FIG. 8A and FIG. 8B are only examples and are not intended to limit the scope of the present disclosure. In other embodiments not described herein, the liquid crystal molecules (positive or negative) may be doped with negative dichroic dyes. Practically, the types and orientations of the liquid crystal molecules and the doped dyes molecules may be adjusted according to the design of the conductive layers and application needs.

Figure 9:
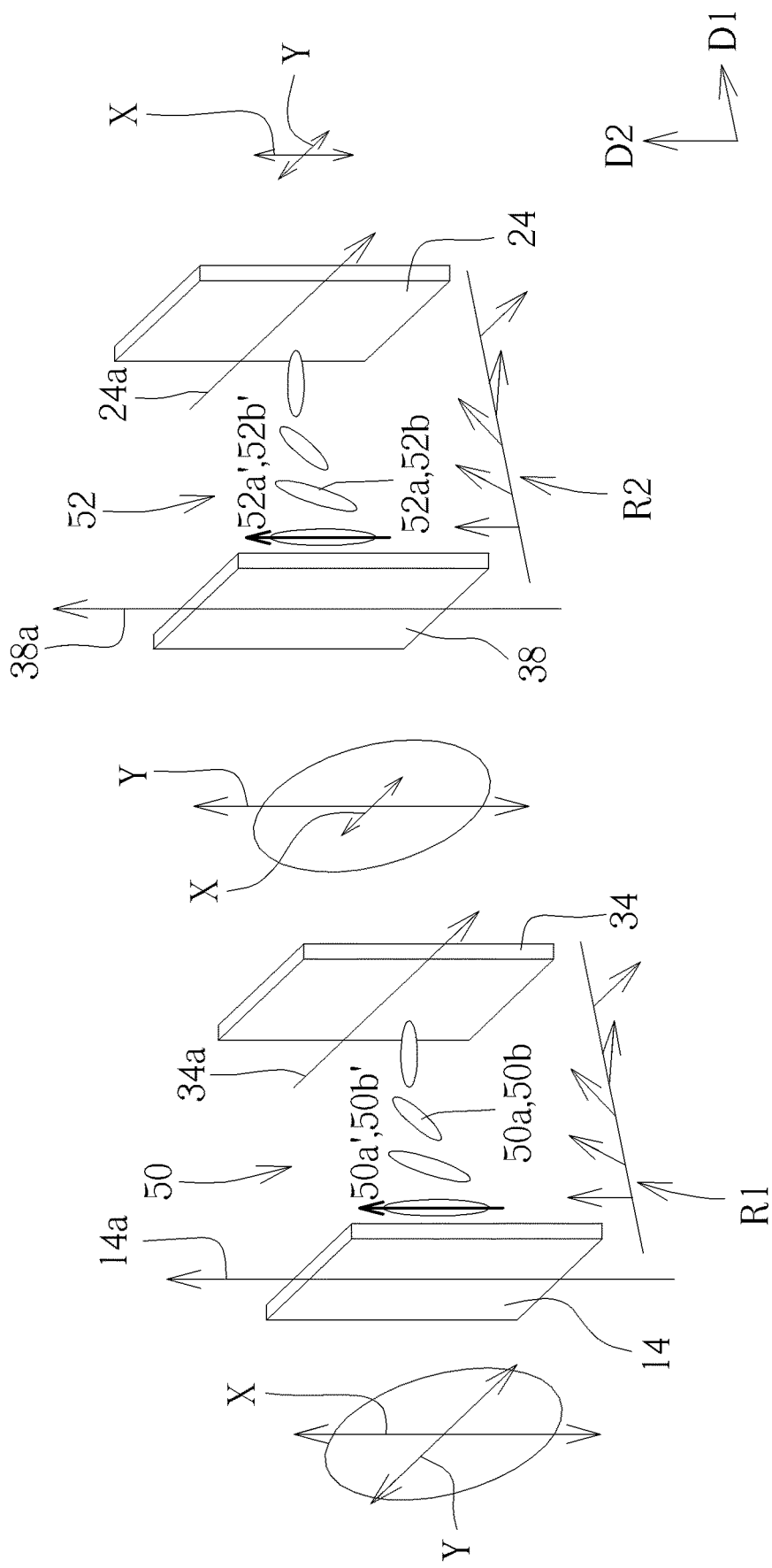
FIG. 9 is a schematic diagram illustrating a path of light passing through an electronic device according to an embodiment of the present disclosure.

Please refer to FIG. 9, which illustrates a path of light passing through an electronic device, such as the electronic device 1 shown in FIG. 4 according to an embodiment of the present disclosure. To simplify the illustration, only shows the first alignment layer 14 disposed on the first substrate 10 of the electronic device 1, the second alignment layer 24 disposed on the second substrate 20, and the third alignment layer 34 and the fourth alignment layer 38 disposed on the third substrate 30 are shown in FIG. 9. For the ease of understanding, the molecular axis 50a' of the liquid crystal molecules 50a (also representing the molecular axis 50b' of the dye molecules doped in the first dye-doped liquid crystal layer 50) of the first dye-doped liquid crystal layer 50 located between the first alignment layer 14 and the third alignment layer 34 is also shown. The molecular axis 52a' of the liquid crystal molecules 52a (also representing the molecular axis 52b' of the dye molecules doped in the second dye liquid crystal layer 52) of the second dye liquid crystal layer 52 between the fourth alignment layer 38 and the second alignment layer 24 is also shown. It should be noted that the orientations of the liquid crystal molecules shown in FIG. 9 are only examples. The types and orientations of the liquid crystal molecules of the electronic device disclosed in this disclosure are not limited to that shown in FIG. 9.

As shown in FIG. 9, the first alignment direction 14a of the first alignment layer 14 and the third alignment direction 34a of the third alignment layer 34 are perpendicular to each other and have an included angle of 90±10 degrees. The fourth alignment direction 38a of the fourth alignment layer 38 and the second alignment direction 24a of the second alignment layer 24 are perpendicular to each other and have an included angle of 90±10 degrees. The first alignment direction 14a and the fourth alignment direction 38a are parallel. The third alignment direction 34a and the second alignment direction 24a are parallel. The liquid crystal molecules 50a in the first dye-doped liquid crystal layer 50 may twist layer by layer between the first alignment layer 14 and the third alignment layer 34. In some embodiments, the liquid crystal molecules 50a may twist layer by layer by 90±10 degree in total and have the molecular axis 50a' from being parallel to the first alignment direction 14a to being parallel to the third alignment direction 34a. The dye molecules 50b also twist layer by layer with the liquid crystal molecules 50a and have the molecular axis 50b' from being parallel to the first alignment direction 14a to being parallel to the third alignment direction 34a. Similarly, the liquid crystal molecules 52a in the second dye-doped liquid crystal layer 52 may twist layer by layer between the fourth alignment layer 38 and the second alignment layer 24. Directions R1 shown in FIG. 9 represents the directions of the molecular axis 50a' of the liquid crystal molecules 50a and the molecular axis 50b' of the dye molecules 50b of different layers. Directions R2 shown in FIG. 9 represents the directions of the molecular axis 52a' of the liquid crystal molecules 52a and the molecular axis 52b' of the dye molecules 52b of different layers. In some embodiments, the liquid crystal molecules 52a may twist layer by layer by 90±10 degree in total and have the molecular axis 52a' from being parallel to the fourth alignment direction 38a to being parallel to the second alignment direction 24a. The dye molecules 52b also twist layer by layer with the liquid crystal molecules 52a and have the molecular axis 52b' from being parallel to the fourth alignment direction 38a to being parallel to the second alignment direction 24a.

The light incident from the left side of FIG. 9 along the direction D1 perpendicular to the surface of the first alignment layer 14 may include two polarized components. One of the components is parallel to the alignment direction of the alignment layer, and the other one of the components is perpendicular to the alignment direction of the alignment layer. For example, the incident light may have a first component X parallel to the first alignment direction 14a of the first alignment layer 14 and a second component Y perpendicular to the first alignment direction 14a. When light passes through the first dye-doped liquid crystal layer 50, the first component X of the light is polarized by the liquid crystal molecules 50a and therefore would stay parallel to the molecular axis 50b' of the dye molecules 50b. As a result, the first component X is absorbed by the dye molecules 50b layer by layer and the intensity of the first component X is reduced. After passing through the first dye liquid crystal layer 50, the light is rotated by 90±10 degrees by being polarized by the first dye-doped liquid crystal layer 50. More specifically, the first component X is rotated to be perpendicular to the first alignment direction 14a and the fourth alignment direction 38a, and the second component Y is rotated to be parallel to the first alignment direction 14a and the fourth alignment direction 38a after passing through the first dye-doped liquid crystal layer 50.

Subsequently, the light passes through the second dye-doped liquid crystal layer 52. The second component Y of the light is polarized by the liquid crystal molecules 52a and therefore would stay parallel to the molecular axis 52b' of the dye molecules 52b. As a result, the second component Y is absorbed by the dye molecules 52b layer by layer and the intensity of the second component Y is reduced. After passing through the second dye liquid crystal layer 52, the light is rotated by 90±10 degrees by being polarized by the second dye-doped liquid crystal layer 52. Specifically, the first component X is rotated to be parallel to the fourth alignment direction 38a and perpendicular to the second alignment direction 24a, and the second component Y is rotated to be perpendicular to the fourth alignment direction 38a and parallel to the second alignment direction 24a after passing through the second dye-doped liquid crystal layer 52. As shown in the right side of FIG. 9, after passing through the first dye-doped liquid crystal layer 50 and the second dye-doped liquid crystal layer 52 as described above, the intensity of the first component X and the intensity of the second component Y of the light are both reduced. By designing the The first alignment direction 14a perpendicular to the third alignment direction 34a being parallel, the fourth alignment direction 38a perpendicular to the second alignment direction 24a, the first alignment direction 14a parallel to the fourth alignment direction 38a, and the third alignment direction 34a parallel to the second alignment direction 24a, the present disclosure may effectively reduce the intensity of the light by making the light continuously passing through the first dye-doped liquid crystal layer 50 and the second dye-doped liquid crystal layer 52 of the electronic device to absorb the components of different directions of the light. The light transmittance of the electronic device in the low transmission state may be further reduced and the light shielding efficiency may be increased.

In summary, the electronic device provided by the present disclosure has the alignment directions of the opposite alignment layers of the liquid crystal cell being perpendicular to each other. In this way, the liquid crystal molecules may twist layer by layer between the two alignment layers when no electric field is applied. The liquid crystal molecules and the dye molecules may be parallel to the surface of the alignment layer. In other words, the light absorption axes of the dye molecules may be kept parallel to the alignment direction of the alignment layer, so that the light absorption efficiency of the dye molecules may be improved. Problems of light leakage at a large viewing angle may also be reduced. Furthermore, by forming two stacked liquid crystal cells to absorb specific polarized lights by sharing the third substrate, the overall thickness of the electronic device may be reduced.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a first substrate;
   a first alignment layer having a first alignment direction disposed on a surface of the first substrate;
   a second substrate disposed opposite to the first substrate;
   a second alignment layer disposed on a surface of the second substrate;
   a third substrate disposed between the first substrate and the second substrate, wherein the third substrate has a first surface closer to the first substrate and a second surface closer to the second substrate;
   a third alignment layer having a third alignment direction disposed on the first surface of the third substrate, wherein the third alignment direction is perpendicular to the first alignment direction;
   a fourth alignment layer disposed on the second surface of the third substrate;
   a first conductive layer disposed between the first substrate and the first alignment layer;
   a second conductive layer disposed between the second substrate and the second alignment layer;
   a third conductive layer disposed between the third substrate and the third alignment layer;
   a fourth conductive layer disposed between the third substrate and the fourth alignment layer;
   a first conductive adhesive directly covering a part of a sidewall of the third substrate and directly contacting the first conductive layer and the second conductive layer; and
   a second conductive adhesive directly covering a part of another sidewall of the third substrate and directly contacting the third conductive layer and the fourth conductive layer,
   wherein the sidewall of the third substrate and the another sidewall of the third substrate are formed by pre-cutting marks on the third substrate.

2. The electronic device according to claim 1, wherein the second alignment layer has a second alignment direction and the second alignment direction is parallel to the third alignment direction.

3. The electronic device according to claim 1, wherein the fourth alignment layer has a fourth alignment direction and the fourth alignment direction is parallel to the first alignment direction.

4. The electronic device according to claim 1, further comprising:
   a first dye-doped liquid crystal layer disposed between the first alignment layer and the third alignment layer; and
   a second dye-doped liquid crystal layer disposed between the second alignment layer and the fourth alignment layer, wherein the first dye-doped liquid crystal layer and the second dye-doped liquid crystal layer respectively comprise at least a dichroic dye.

5. The electronic device according to claim 4, wherein the first dye-doped liquid crystal layer and the second dye-doped liquid crystal layer have same liquid crystal molecules and dye molecules.

6. The electronic device according to claim 1, wherein in a normal direction of the surface of the first substrate, the sidewall of the third substrate is recessed between the first substrate and the second substrate.

7. The electronic device according to claim 1, wherein in a normal direction of the surface of the first substrate, another sidewall of the third substrate is protruding between the first substrate and the second substrate.

8. An electronic device, comprising:
   a first substrate;
   a first alignment layer having a first alignment direction disposed on a surface of the first substrate;
   a second substrate disposed opposite to the first substrate;
   a second alignment layer disposed on a surface of the second substrate;
   a third substrate disposed between the first substrate and the second substrate,
   wherein the third substrate has a first surface closer to the first substrate and a second surface closer to the second substrate;
   a third alignment layer having a third alignment direction disposed on the first surface of the third substrate, wherein the third alignment direction is perpendicular to the first alignment direction; and
   a fourth alignment layer disposed on the second surface of the third substrate,
   wherein the first substrate and the third substrate are displaced layer by layer along a direction parallel to the surface of the first substrate to form a stepped structure, the third substrate and the second substrate are displaced layer by layer along the direction to form another stepped structure,
   wherein along the direction, a sidewall of the third substrate is between a sidewall of the first substrate and a sidewall of the second substrate at a same side of the electronic device,
   wherein the sidewall of the third substrate is formed by pre-cutting marks on the third substrate.

* * * * *